(12) United States Patent
Nieh et al.

(10) Patent No.: US 7,296,102 B2
(45) Date of Patent: Nov. 13, 2007

(54) METHOD AND CHIP TO EXPAND PINS OF THE CHIP

(75) Inventors: Yu-Cheng Nieh, Taipei County (TW); Han-Liang Chou, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 471 days.

(21) Appl. No.: 10/710,766

(22) Filed: Aug. 2, 2004

(65) Prior Publication Data
US 2005/0256982 A1 Nov. 17, 2005

(30) Foreign Application Priority Data
May 13, 2004 (TW) .................. 93113404 A

(51) Int. Cl.
*G06F 13/14* (2006.01)
*G06F 13/00* (2006.01)

(52) U.S. Cl. ............................ 710/62; 710/5
(58) Field of Classification Search .............. 710/5–10, 710/33, 62–66, 72–73, 105–106; 365/189.1, 365/233; 377/75
See application file for complete search history.

(56) References Cited
U.S. PATENT DOCUMENTS

| | | | | |
|---|---|---|---|---|
| 4,710,927 | A * | 12/1987 | Miller | 714/724 |
| 4,958,277 | A * | 9/1990 | Hill et al. | 710/52 |
| 6,331,784 | B1* | 12/2001 | Mason et al. | 326/8 |
| 2005/0262289 | A1* | 11/2005 | Okuda | 711/100 |
| 2007/0019743 | A1* | 1/2007 | Dambrackas et al. | 375/240.26 |

* cited by examiner

*Primary Examiner*—Christopher Shin
(74) *Attorney, Agent, or Firm*—Jianq Chyun IP Office

(57) ABSTRACT

A method and a chip for expanding pins of a chip are disclosed. A first interface of a first chip transmits an encoded second interface command. When a second chip receives the encoded second command, a second chip decodes the encoded second interface command and transmits allowing the pins of the second chip to transmit the second interface command and thereby achieve the expansion of pins of the first chip. Because of the low pin count of the second chip that can accommodate pins of the first chip, there is no need to increase the pin count of the first chip, therefore the packaging cost of the first chip is substantially reduced without significantly increasing the packaging cost for the second chip.

7 Claims, 2 Drawing Sheets

METHOD AND CHIP TO EXPAND PINS OF THE CHIP

CROSS REFERENCE TO RELATED APPLICATIONS

This application claims the priority benefit of Taiwan application serial 93113404, filed May 13, 2004.

BACKGROUND OF INVENTION

1. Field of the Invention

The present invention relates to a system on chip (SOC), and more particularly to a method and a chip adapted for expanding pins of the chip.

2. Description of Related Art

With the development of system on chip (SOC), integrated circuits can perform more functions and are more sophisticated. In order to integrate chips with different functions in a single chip, I/O pins of the chip are also gradually increased. The packaging cost of integrated circuits with a large number of pins is high. Therefore, reducing the packing costs for integrated circuits is an important object in this industry.

To overcome the problem resulting from the integration of multiple chips, one approach is to expand the number of pins. Another approach is to use multiple-functional pins via a specific interface to reduce the number of pins. For example, Intel Corp. disclosed a low pin count (LPC) interface, which substantially reduces the number of pins of flash memory interface. This technique is widely adopted in this industry. Although this technique is capable of reducing the number of pins of some specific interfaces, however, this technique does not resolve the problem that new interfaces require additional pins. If additional pins for a new interface are required, still packaging of integrated circuits with high pin count is required, and therefore increase in the packaging costs is inevitable.

SUMMARY OF INVENTION

Accordingly, the present invention is directed to a method and a chip for expanding pins of the chip. The pins on the first chip that are required to be expanded are transferred to the second chip. Therefore, the packaging cost of the first chip is substantially reduced and the packaging cost of the second chip is not significantly increased.

According to an embodiment of the present invention, a first interface of a first chip is used to transfer pins of a second interface of the first chip to a second chip. First, a second interface command to be transmitted by the second interface of the first chip is encoded into a first interface command to be transmitted by the first interface. Next, the second chip receives the first interface command and the first interface command is decoded into the second interface command. Thus, pins of the second chip are capable of transmitting the second interface command.

In an embodiment of the present invention, the first chip is an audio/video player chip and the second chip is a memory chip.

In an embodiment of the present invention, the first interface is an address/data bus and the second interface is a general-purpose input/output (GPIO).

The present invention is also directed to a chip capable of expanding pins. The chip comprises a core logic, a multiplexer, a controller, a command encoder and an arbitrator. The controller is coupled to the core logic and the multiplexer, and is adapted for receiving a command from the core logic and transmitting a first interface command. The command encoder is coupled to the core logic and the multiplexer, and is adapted for receiving a second interface command and encoding the second interface command into the first interface command. The arbitrator is coupled to the core logic and the multiplexer, and is adapted for controlling the multiplexer and selective transmitting the first interface command of the controller or the command encoder.

In an embodiment of the present invention, the core logic is an audio/video player logic.

In an embodiment of the present invention, the controller is a memory controller.

In an embodiment of the present invention, the first interface command is a memory access command.

The present invention is also directed a memory chip. The memory chip comprises a memory circuit, an address decoder and a command decoder. The address decoder is coupled to the memory circuit, and is adapted for receiving a memory access command and transmitting the memory access command according to an access address of the memory access command. The command decoder is coupled to the address decoder, and is adapted to decode the memory access command transmitted by a second interface.

In an embodiment of the present invention, the second interface is a GPIO.

Accordingly, the pins to be expanded can be transferred to the second chip by the first chip according to the method described above. The packaging cost of the first chip is significantly reduced and the packaging cost of the second chip is not significantly increased.

In order to make the aforementioned and other objects, features and advantages of the present invention understandable, a preferred embodiment accompanied with figures is described in detail below.

DETAILED DESCRIPTION

In addition to system main chips, an audio/video player system also comprises memories like ROM and DRAM and some periphery assistant chips for a liquid crystal display and step motors. With these chips, the audio/video system performs normally. Due to the requirements of high-density memories, special memories, and high-voltage and high-current integrated circuits, hardly can these chips be integrated in a signal chip by the present standard semiconductor manufacturing process.

The peripheral assistant chips for the system have fewer pins than the system main chips, therefore the packaging costs of the peripheral assistant chips is comparatively inexpensive. According to an embodiment of the present invention an encoding/decoding circuit is integrated into each of the system main chip and peripheral assistant chip. Commands and data are transmitted by using a traditional interface, such as address/data bus, to the peripheral assistant chip for expanding the pins of the chip. Accordingly, the packaging costs of the system main chip can be substantially reduced without significantly increasing the packaging costs of the peripheral assistant chip.

Figure 1:
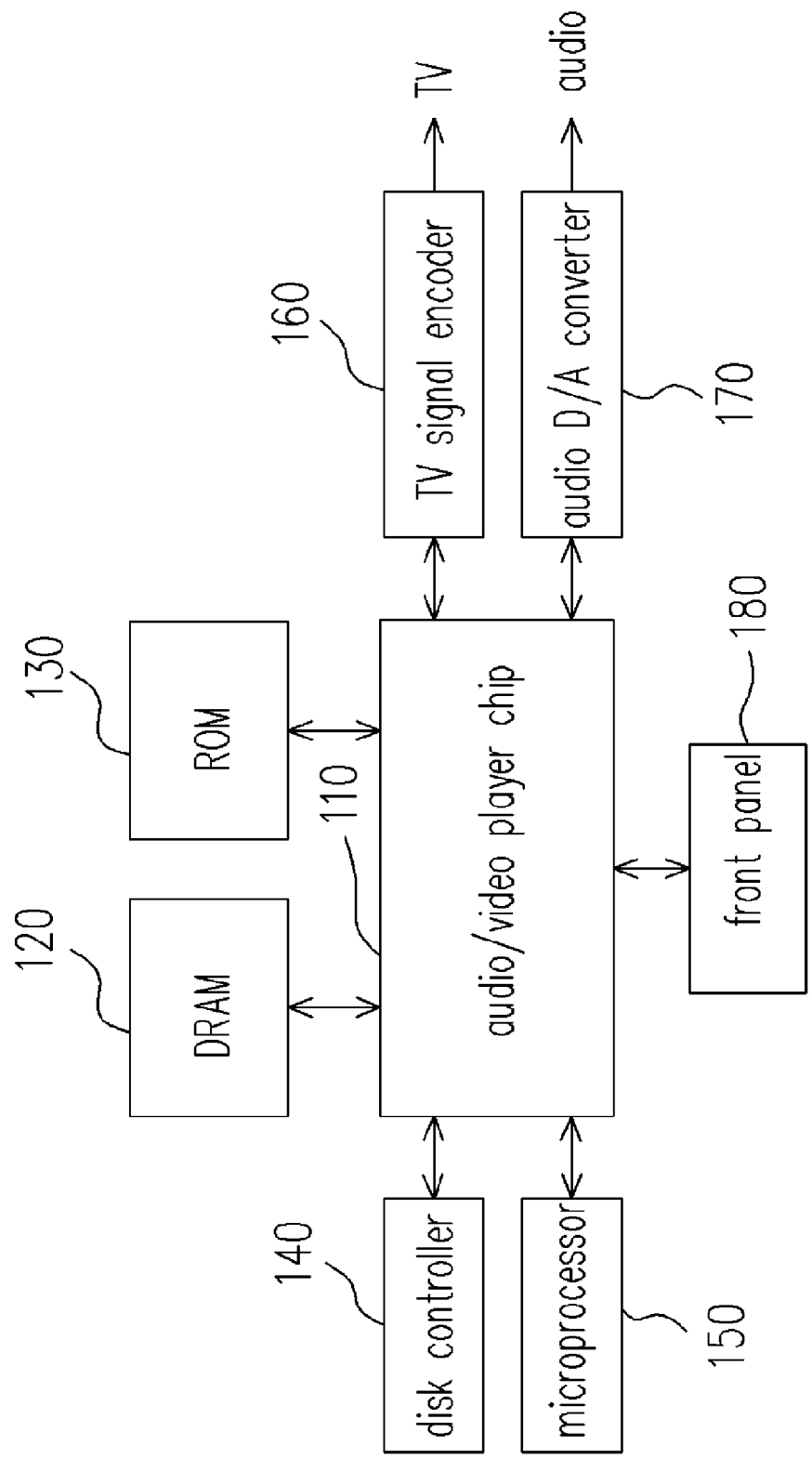
FIG. 1 is a schematic block diagram of a traditional audio/video player system.

FIG. 1 is a schematic block diagram of a traditional audio/video player system. Referring to FIG. 1, the audio/video player system comprises an audio/video player chip 110, and a DRAM 120, a ROM 130, a disk controller 140, a microprocessor 150, a TV signal encoder 160, an audio D/A converter 170 and a front display 180 coupled to the audio/video player chip 110 via an interface such as an address/data bus or a general-purpose input/output (GPIO). For integrating the DRAM 120, the ROM 130, the disk controller 140, the microprocessor 150, the TV signal encoder 160, the audio D/A converter 170 and the front display 180, pins for the aforementioned devices should be provided on the audio/video player chip 110. As a result, the packaging costs of the audio/video player chip 110 including a large number of pins would be significantly high.

Figure 2:
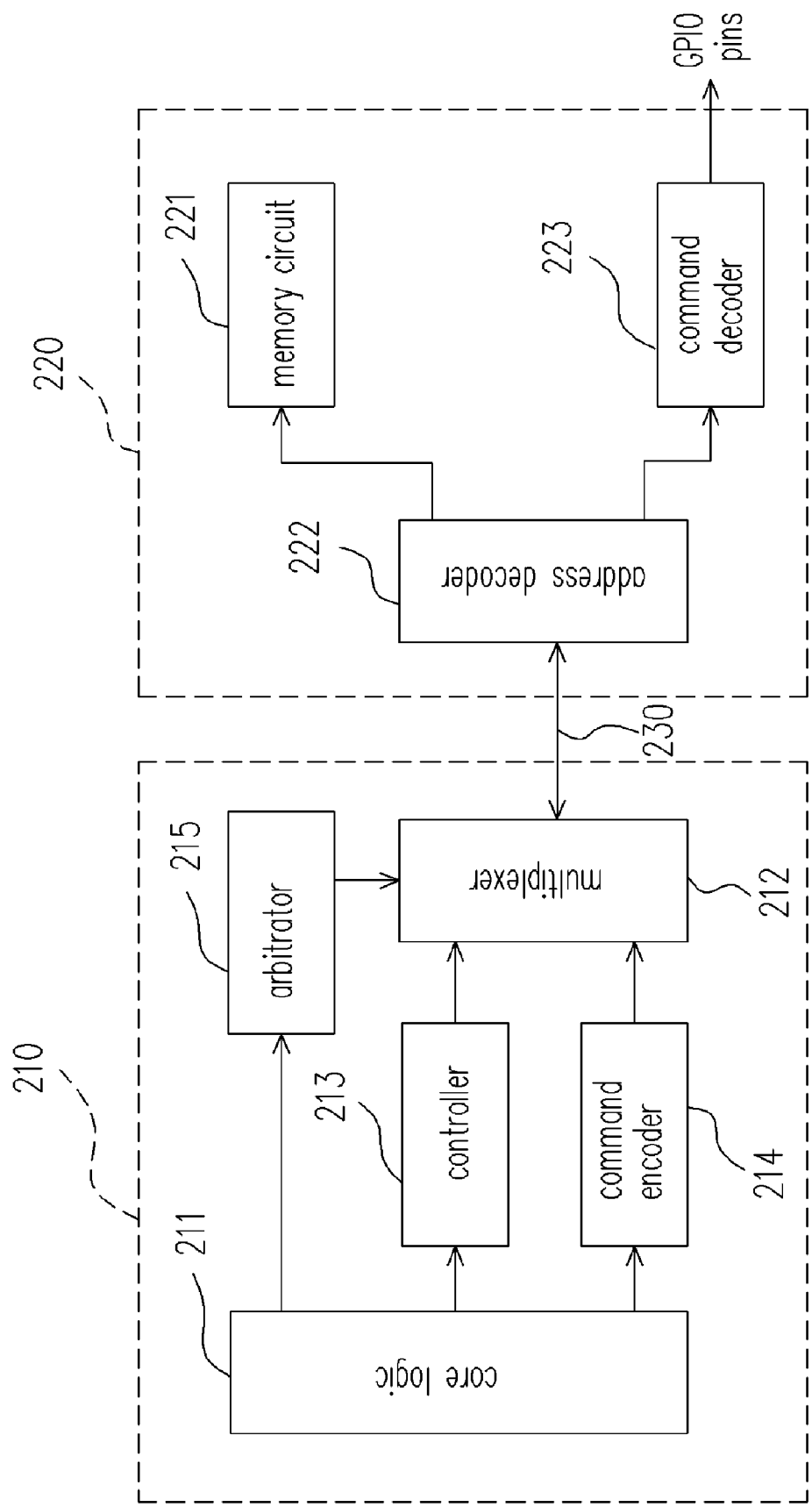
FIG. 2 is a schematic block diagram of an audio/video player system according to an embodiment of the present invention.

FIG. 2 is a schematic block diagram of an audio/video player system according to an embodiment of the present invention. The audio/video player system comprises an audio/video player chip 210 serving as a system main chip and a memory chip 220 coupled thereto via an address/data bus 230. The GPIO coupled to the front display 180 in FIG. 1 is integrated in the memory chip 220. Accordingly, the pins for the front display 180 in FIG. 1 are transferred to the memory chip 220. By transferring the pins, the pin count as well as the packaging cost of the audio/video player chip 210 is reduced.

For example, the packaging method of the audio/video player chip 210 is Quad Flat Package (QFP) with 256 pins, and the packaging method of the memory chip 220 is Thin Small Outline Package (TSOP) with 32 pins. When the GPIO for the audio/video player chip 210 has 16 pins, the audio/video player chip 210, according to an embodiment of the present invention, can adopt QFP with 240 pins and the memory chip 220 can adopt TSOP with 48 pins. Although the sum of the pins of the audio/video player chip 210 and the memory chip 220 is not changed, the pins of the audio/video player chip 210 are reduced. By the reduction of the pins of the audio/video player chip 210, the total packaging costs of the audio/video player chip 210 and the memory chip 220 are reduced. In the present embodiment, the memory chip 220 can be, for example, a DRAM, SDRAM, ROM, OTP ROM, MTPROM, EPROM or FLASH.

Referring to FIG. 2, the audio/video player chip 210 comprises: a core logic 211 serving logic function for the audio/video player chip 210, a multiplexer 212, a controller 213 with memory control function, a command encoder 214 and an arbitrator 215. The controller 213 is coupled to the core logic 211 and the multiplexer 212, and is adapted for receiving the command of the core logic 211. Through the interface of the address/data bus 230, a first interface command, such as memory read/write command, is transmitted. The command encoder 214 is coupled to the core logic 211 and the multiplexer 212, and is adapted for receiving a second interface command to be transmitted via GPIO pins in FIG. 2 for encoding the second interface command into a memory access command that can be transmitted via the address/data bus 230. The arbitrator 215 is also coupled to the core logic 211 and the multiplexer 212, and is adapted for controlling the multiplexer 212 and selectively transmitting the memory access command of the controller 213 or the command encoder 214 via the address/data bus 230.

Referring to FIG. 2, the memory chip 220 comprises a memory circuit 221, an address decoder 222 and a command decoder 223. The address decoder 222 is coupled to the memory circuit 221 and is adapted for receiving the memory access command through the address/data bus 230. The memory access command is transmitted according to the access address of the memory access command. For example, when the access address falls within the addressing scope of the memory circuit 221, the memory access command is transmitted to the memory circuit 221 and read or written therein. If the access address does not fall within the addressing scope of the memory circuit 221, the memory access command is transmitted to the command decoder 223. The command decoder 223 decodes the memory access command and transmits the decoded command via the GPIO.

Accordingly, the present invention discloses a method of expanding the pins of the chip suitable for an address/data bus of a first chip (such as an audio/video player chip). The method transfers the pins of the audio/video player chip for the GPIO to a second chip (such as a memory chip) by using the address/data bus of the audio/video player chip. The packaging cost of the first chip is substantially reduced and without significantly increasing the packaging cost of the second chip. The method of expanding the pins of the chip comprises: encoding a second interface command to be transmitted by the first chip via the second interface (such as the GPIO) into a first interface command to be transmitted by the first interface (such as the address/data bus); and receiving the first interface command and decoding the first interface command into the second interface command to allow pins of the second chip transmit the second interface command.

Although the present invention has been described in terms of exemplary embodiments, it is not limited thereto. Rather, the appended claims should be constructed broadly to include other variants and embodiments of the invention, which may be made by those skilled in the field of this art without departing from the scope and range of equivalents of the invention.

The invention claimed is:

1. A method of expanding pins of a chip for using first interface of a first chip to transfer pins of a second interface of the first chip to a second chip, comprising:
   encoding a second interface command transmitted by a second interface of a first chip into a first interface command, wherein the first interface command can be transmitted by a first interface of the first chip; and
   receiving the encoded first interface command and decoding the first interface command into the second interface command, wherein the first interface command is received by a second chip so that pins of the second chip can transmit the second interface command.

2. The method of expanding pins of a chip of claim 1, wherein the first chip is a DVD or VCD player chip, wherein the first chip comprises:
   a core logic;
   a multiplexer;
   a controller, coupled to the core logic and the multiplexer, adapted for receiving a command from the core logic to transmit a first interface command;
   a command encoder, coupled to the core logic and the multiplexer, adapted for receiving a second interface command and encoding the second interface command into the first interface command; and
   an arbitrator, coupled to the core logic and the multiplexer, adapted for controlling the multiplexer and selectively transmitting the first interface command of the controller or the command encoder.

3. The method of expanding pins of a chip of claim 1, wherein the first interface is an address/data bus.

4. A chip for expanding pins of a chip, comprising:

a core logic;

a multiplexer;

a controller, coupled to the core logic and the multiplexer, adapted for receiving a command from the core logic to transmit a first interface command;

a command encoder, coupled to the core logic and the multiplexer, adapted for receiving a second interface command and encoding the second interface command into the first interface command; and an arbitrator, coupled to the core logic and the multiplexer, adapted for controlling the multiplexer and selectively transmitting the first interface command of the controller or the command encoder.

5. The chip for expanding pins of a chip of claim 4, wherein the core logic is an audio/video player logic.

6. The chip for expanding pins of a chip of claim 4, wherein the controller is a memory controller.

7. The chip for expanding pins of a chip of claim 4, wherein the first interface command is a memory access command.

* * * * *